(12) United States Patent
Emigh

(10) Patent No.: US 9,757,978 B1
(45) Date of Patent: Sep. 12, 2017

(54) UNIVERSAL TRACTION WHEEL AND ASSOCIATED VEHICLE

(71) Applicant: Jonathan D. Emigh, Somerset, CA (US)

(72) Inventor: Jonathan D. Emigh, Somerset, CA (US)

(*) Notice: Subject to any disclaimer, the term of this patent is extended or adjusted under 35 U.S.C. 154(b) by 66 days.

(21) Appl. No.: 14/545,914

(22) Filed: Jul. 7, 2015

Related U.S. Application Data

(60) Provisional application No. 61/998,916, filed on Jul. 11, 2014.

(51) Int. Cl.

| | | |
|---|---|---|
| *B60C 7/18* | (2006.01) | |
| *B60B 19/04* | (2006.01) | |
| *B60B 1/00* | (2006.01) | |
| *B62D 33/10* | (2006.01) | |
| *B60L 11/00* | (2006.01) | |
| *B60K 1/02* | (2006.01) | |
| *B62D 63/04* | (2006.01) | |

(52) U.S. Cl.
CPC ............... *B60B 19/04* (2013.01); *B60B 1/00* (2013.01); *B60K 1/02* (2013.01); *B60L 11/00* (2013.01); *B62D 33/10* (2013.01); *B62D 63/04* (2013.01); *B60B 2900/551* (2013.01); *B60Y 2300/02* (2013.01)

(58) Field of Classification Search
CPC .......................... B60B 19/04; B60B 2900/551
USPC ...................... 180/8.2; 301/5.1, 16
See application file for complete search history.

(56) References Cited

U.S. PATENT DOCUMENTS

| | | | |
|---|---|---|---|
| 210,492 A | 12/1878 | Broja | |
| 1,371,980 A | 3/1921 | Ramsey | |
| 1,413,608 A * | 4/1922 | Overboe | B60O 7/18 152/291 |
| 1,435,042 A | 11/1922 | Zottoli | |
| 1,469,393 A | 10/1923 | O'Connor | |
| 3,179,431 A | 4/1965 | Pild | |
| 3,196,970 A | 7/1965 | Brenner | |
| 3,226,129 A | 12/1965 | McKinley | |
| 3,269,478 A | 8/1966 | Joslyn | |
| 4,061,199 A | 12/1977 | Last | |
| 4,108,231 A * | 8/1978 | Holchuk | B60B 9/06 152/290 |
| 4,420,192 A | 12/1983 | Holchuk | |
| 5,492,390 A * | 2/1996 | Kugelmann, Sr. | B60B 19/00 301/5.1 |
| 7,380,618 B2 | 6/2008 | Gunderson et al. | |
| 7,503,567 B2 | 3/2009 | Frankie | |
| 7,806,208 B2 | 10/2010 | Gunderson et al. | |
| 9,290,054 B2 * | 3/2016 | Pfrenger | B60O 7/22 |

FOREIGN PATENT DOCUMENTS

DE  10324740 A9  5/2005

* cited by examiner

*Primary Examiner* — Tony Winner
(74) *Attorney, Agent, or Firm* — James M. Ritchey

(57) ABSTRACT

A universal traction device for movement over even and uneven supporting surfaces that includes an all-terrain wheel having a circular wheel assembly with a plurality of spoke-containing components arrayed around an outer perimeter wheel edge and control means for extending spokes from the spoke-containing units when encountering an obstacle that the vehicle is to traverse and retracting the spokes when the spokes are no longer required for traversing the obstacle.

4 Claims, 13 Drawing Sheets

UNIVERSAL TRACTION WHEEL AND ASSOCIATED VEHICLE

CROSS-REFERENCE TO RELATED APPLICATIONS

This application claims priority to, and the benefit of, U.S. provisional patent application Ser. No. 61/998,916 filed on Jul. 11, 2014, incorporated herein by reference in its entirety.

STATEMENT REGARDING FEDERALLY SPONSORED RESEARCH OR DEVELOPMENT

Not Applicable

INCORPORATION-BY-REFERENCE OF COMPUTER PROGRAM APPENDIX

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. §1.14.

BACKGROUND

1. Technical Field

The subject invention pertains generally to a universal traction or all-terrain wheel and associated universal traction or all-terrain vehicle, wherein the subject wheel primarily utilizes a plurality of vertical or near-vertical force-members for lift and movement over a supporting surface, thereby allowing the associated vehicle to travel over many types of uneven terrain. The universal traction vehicle incorporates stability means that allow a user to ride in a relatively level position over uneven supporting surfaces.

2. Background Discussion

Many existing devices describe unusual wheels for traversing uneven ground, but all fail to employ the means utilized by the subject wheel and associated vehicle.

The French "Demande De Brevet D'Invention" (No.: 2,829,968) describes a wheel with multiple internal struts that support a hinged perimeter member. As the wheel encounter an obstacle the perimeter member deforms and grips the obstacle by means of friction as the internal struts flex slightly. Lifting forces are dispersed throughout the wheel via the friction on the perimeter member and the flexing internal struts and not, primarily, as vertical forces (see FIGS. 4-6).

A patent from Russia/USSR (No.: 1,299,883) relates a climbing device that utilizes four square wheels, with each wheel having four internal struts. As the vehicle encounters a step a flexible perimeter belt deforms to lift the vehicle onto the step. The friction between the flexible perimeter belt and the steps provides the force that propels the vehicle up the steps.

U.S. Pat. No. 210,492 presents an interesting traction-engine that employs a series of mechanical "feet-and-legs" around the perimeter of a wheel. As the wheel turns the foot-leg that is in contact with the ground forces the vehicle forward by friction between the foot and the ground. The method of movement is very similar to a person walking over the ground and using the contact friction between each foot and the ground to move.

U.S. Pat. No. 1,371,980 shows a wheel fitted with resilient plungers that soften the impact of the wheel on the supporting surface. This device is a type of shock-absorber that is mated into the structure of the wheel and is used to prevent the transmission of road shocks to the vehicle utilizing the wheels.

U.S. Pat. No. 1,469,393 describes a resilient wheel for quieter and smoother travel over a supporting surface. The wheel absorbs road shock by means of a set of interlocking resilient feet mounted to supporting springs and disposed in a circular manner about a central hub.

Related in U.S. Pat. No. 3,179,431 is an obstacle-climbing wheel chair. This device relies on articulated wheels with a flexible outer perimeter that collapses in sections to step-up the treads on a set of stairs. The flexible outer perimeters of multiple wheels lift the wheel chair up and over the obstacle, such as a step or series of steps. The articulated wheels catch the steps that comprise a stairway and crawl up the stairway. The wheel chair travels up the set of stairs in a backward orientation with the rider looking downward and not upward in the direction of motion for climbing.

U.S. Pat. No. 3,196,970 presents a stair-climbing wheel chair in which each wheel includes two multiple legged and belted-together propelling units. Each propelling unit comprises a plurality of legs and associated feet that allow the wheel chair to step up a set of step. Again, the wheel chair travels up the set of stairs in a backward orientation with the rider looking downward and not upward in the direction of motion for climbing.

Disclosed in U.S. Pat. No. 3,226,129 is a vehicle and deformable wheels for climbing a set of stairs. Each wheel is configured into a set of four hinged sections. As the vehicle encounters a set of steps the quarters hinge inward toward the hub to provide lifting support for the climb. Once again, the vehicle travels up the set of stairs in a backward orientation with the rider looking downward and not upward in the direction of motion for climbing.

A stair climbing wheel chair is shown in U.S. Pat. No. 3,269,478. Paired legs on each side of the wheel chair are coupled together in a manner that allows the wheel chair to step up the treads in the set of stairs. As above, the wheel chair travels up the set of stairs in a backward orientation with the rider looking downward and not upward in the direction of motion for climbing.

U.S. Pat. No. 4,061,199 relates a chassis for a vehicle capable of travelling over obstructions like a set of steps. A belt-surrounded climbing member is lowered when an obstruction is encountered. The climbing member has multiple support wheels that contact the underside of the surrounding belt. Friction from the moving belt over the support wheels, as they rotate, propels the vehicle over the obstruction. In a similar manner to those described above, the vehicle travels up the set of stairs in a backward orientation with the rider looking downward and not upward in the direction of motion for climbing.

Described in U.S. Pat. Nos. 7,380,618 and 7,806,208 is a stair climbing platform apparatus that utilizes wheels that have extendable and retractable spokes. Incorporated into the subject apparatus and controlling the position of each spoke is a microcontroller coupled to multiple sets of obstacle proximity sensors and force and position sensors. Each wheel in continually monitoring a sensor field to detect any existing obstacle like steps in a set of stairs. The spoke extend to varied lengths to allow the platform to move up the stairs in a relatively smooth path profile. Downward motion is basically permitted in a reverse operational mode.

An automated wheel chair is exhibited in U.S. Pat. No. 7,503,567. As with the device described in U.S. Pat. No. 7,380,618 immediately above, a computer controls the extension and retraction of spokes for climbing a set of stairs. Additionally, a pair of stabilizing support members is included in this apparatus to prevent the wheel chair form tipping down the set of stairs and flipping over. As indicated several times above, the wheel chair travels up the set of stairs in a backward orientation with the rider looking downward and not upward in the direction of motion for climbing.

It is stressed the subject invention relies on an essentially downward force to propel the subject invention. The essentially downward force is directed between each wheel spoke and the supporting surface, unlike the devices described above in which frictional gripping provides the bulk of the propulsion force.

BRIEF SUMMARY

An object of the technology described herein is to provide a universal traction or all-terrain wheel.

Another object of the technology described herein is to furnish a universal traction or all-terrain wheel and associated universal traction or all-terrain vehicle.

A further object of the technology described herein is to supply a universal traction or all-terrain wheel that utilizes a plurality of vertical or near-vertical force-members for lift and movement over a supporting surface.

Still another object of the technology described herein is to disclose a universal traction or all-terrain wheel and associated universal traction or all-terrain vehicle, wherein the subject wheel primarily utilizes a plurality of vertical or near-vertical force-members for lift and movement over a supporting surface, thereby allowing the associated vehicle to travel over many types of uneven terrain.

Yet a further object of the technology described herein is to describe a universal traction or all-terrain vehicle that incorporates stability means that allow a user to ride in a relatively level position over uneven supporting surfaces.

Disclosed is a universal traction device for movement over even and uneven supporting surfaces that comprises: a) an all-terrain wheel utilized in conjunction with a transportation vehicle that comprises: i) a circular wheel assembly having an outer perimeter edge and a central hub region radial disposed about a rotation point for said circular wheel; ii) a plurality of spoke-containing components having first and second ends, wherein the plurality of spoke-containing units are arrayed around the outer perimeter edge with the first end proximate the outer perimeter edge and the second end proximate the hub region; and iii) control means for extending the spokes from the spoke-containing units when encountering an obstacle that the wheel is to traverse and retracting the spokes into the spoke-containing units when the spokes are no longer required for traversing the obstacle; and b) a vehicle having at least one all-terrain wheel.

Additionally disclosed is an all-terrain transportation system for moving over even or uneven supporting surfaces that comprises: a) an all-terrain wheel utilized in conjunction with a transportation vehicle that comprises: i) a circular wheel assembly having an outer perimeter edge and a central hub region radial disposed about a rotation point for the circular wheel; ii) a plurality of spoke-containing components having first and second ends, wherein the plurality of spoke-containing units are arrayed around the outer perimeter edge with the first end proximate the outer perimeter edge and the second end proximate the hub region; and iii) first control means for extending the spokes from the spoke-containing units when encountering an obstacle that the wheel is to traverse and retracting the spokes into the spoke-containing units when the spokes are no longer required for traversing the obstacle; b) a wheel axle coupled to each all-terrain wheel and mounted to said transportation vehicle; c) the transportation vehicle having at least one all-terrain wheel; d) an electric motor configured to drive each all-terrain wheel and associated with the transportation vehicle; e) an electrical power supply means coupled to each said electric motor and associated with said transportation vehicle; f) a vehicle parallelogram suspension means configured to permit each all-terrain wheel to move up and down; g) a frame means associated with the parallelogram that permits each all-terrain wheel to turn over approximately 100 degrees, thereby allowing the transportation vehicle to turn in its own length; h) a payload slide means associated with the parallelogram suspension means that allows a payload to be shifted either forward or backward depending on climbing or descending obstacles; and i) second control means for sensing and stabilizing the transportation vehicle if the transportation vehicle is going into an unstable alignment relative to the even or uneven supporting surfaces. Usually the \ first control means comprises a programmed computer means and the second control means comprises a programmed computer means that is interfaced with: a) an accelerometer linked to each said wheel axle and b) an axle positioner coupled to each said wheel axle.

Further disclosed is an all-terrain wheel utilized in conjunction with a transportation vehicle, wherein the all-terrain wheel comprises: a) a circular wheel assembly having an outer perimeter edge and a central hub region radial disposed about a rotation point for the circular wheel; b) a plurality of spoke-containing components having first and second ends, wherein the plurality of spoke-containing units are arrayed around the outer perimeter edge with the first end proximate the outer perimeter edge and the second end proximate the hub region; and c) control means for extending the spokes from the spoke-containing units when encountering an obstacle that the wheel is to traverse and retracting the spokes into the spoke-containing units when the spokes are no longer required for traversing the obstacle. The control means usually comprise a programmed computer means.

Further aspects of the technology described herein will be brought out in the following portions of the specification, wherein the detailed description is for the purpose of fully disclosing preferred embodiments of the technology without placing limitations thereon.

BRIEF DESCRIPTION OF THE SEVERAL VIEWS OF THE DRAWING(S)

The technology described herein will be more fully understood by reference to the following drawings which are for illustrative purposes only:

The invention will be more fully understood by reference to the following drawings which are for illustrative purposes only:

DETAILED DESCRIPTION

Referring more specifically to the drawings, for illustrative purposes the subject technology is embodied in the universal traction wheel and vehicle generally depicted in FIGS. 1 through 11. It will be appreciated that the subject invention may vary as to configuration and as to details of the components, and that the method of use may vary as to the specific steps and sequence, without departing from the basic concepts as disclosed herein.

Generally, the subject invention is illustrated in FIGS. 1 through 11 and comprises a universal traction or all-terrain wheel that is incorporated into an all-terrain transportation vehicle of any desired configuration to create a universal traction or all-terrain device that is capable of being transported, with a user and/or cargo, over varied and undulating supporting surfaces/terrain. More specifically, the subject invention comprises a plurality of processes and mechanisms that function together to achieve a specific object, the relatively level-movement of the vehicle over varied terrain. Traditional traction systems or vehicles utilize friction as the primary motivational factor to propel the vehicle over a supporting surface. Some existing systems utilize portions of the traction principles employed in the subject invention, but no existing device has addressed all of the relevant motion issues solved by the subject invention. In order to climb over any obstacle, you must be able to use friction between the track or wheel and the surface being climbed to allow enough force for the traction device to lift its own weight and the weight of the payload up or down any surface that it is required to traverse. This is usually accomplished by a set of drive wheels or tracks to push the front wheels or tracks up the surface a sufficient distance to grab onto a horizontal surface strong enough to pull the weight of the vehicle and payload up to the next level of climb. This has always been problematic because if the surface is slippery, there is little or no friction to use for climbing or descending.

The subject universal traction device or UTD is designed to work primarily off of a vertical force basis and not to use primarily friction to achieve the climb as other devices do. Consider a set of steps made out of ice, as soon as the traditional or primarily friction driven vehicle has both drivers (wheels or tracks) onto the steps and off of the friction surface at the bottom of the steps, it can't climb any higher. The UTD uses vertical forces that apply a linear force straight down on the surface, so that the subject device does not even "know" that the steps are made of ice since vertical force are primarily involved in the motion.

Figure 1A:
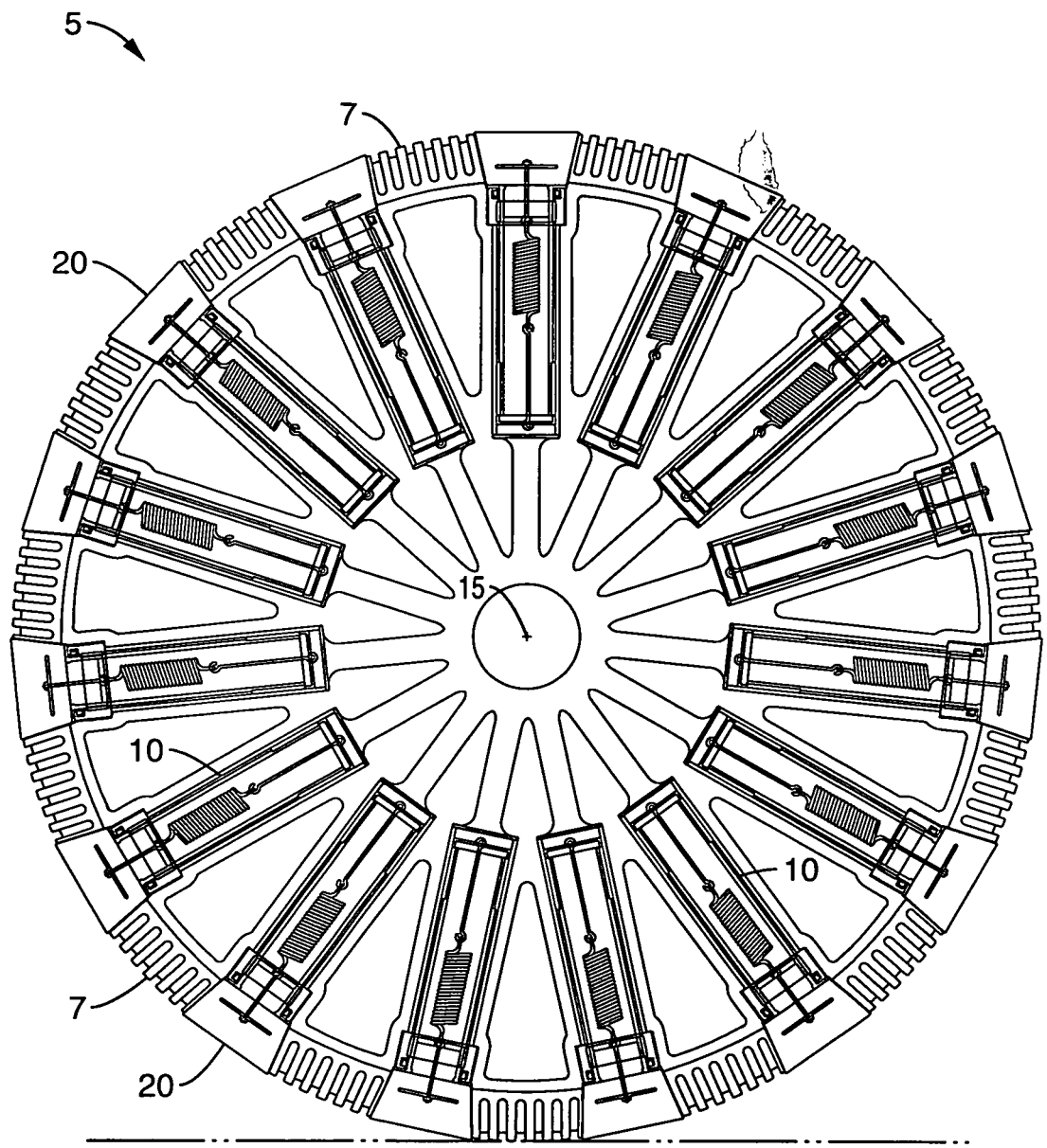
FIG. 1A shows an embodiment of the subject wheel with the spokes retracted.
Figure 1B:
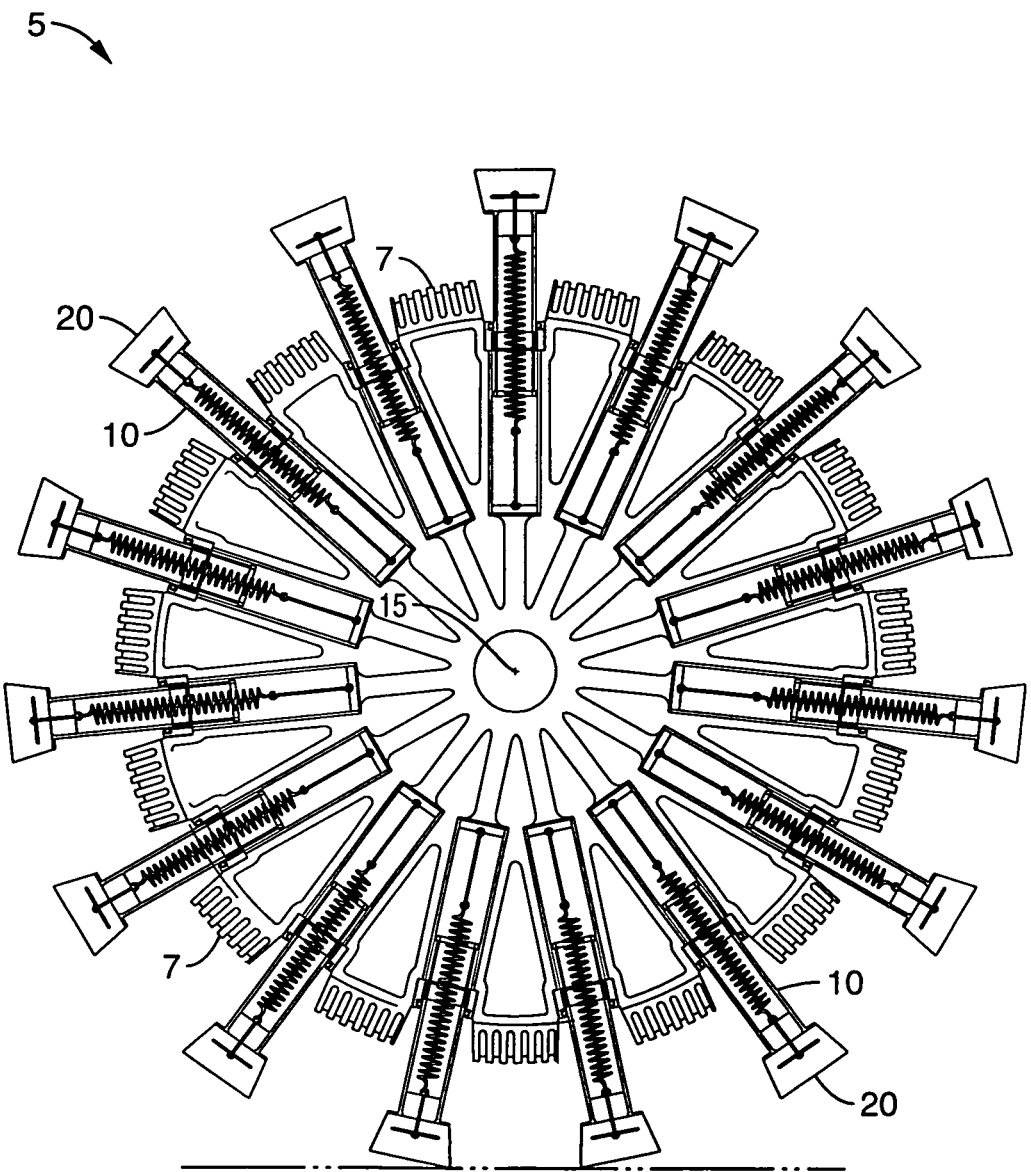
FIG. 1B shows an embodiment of the subject wheel with the spokes extended.
Figure 2:
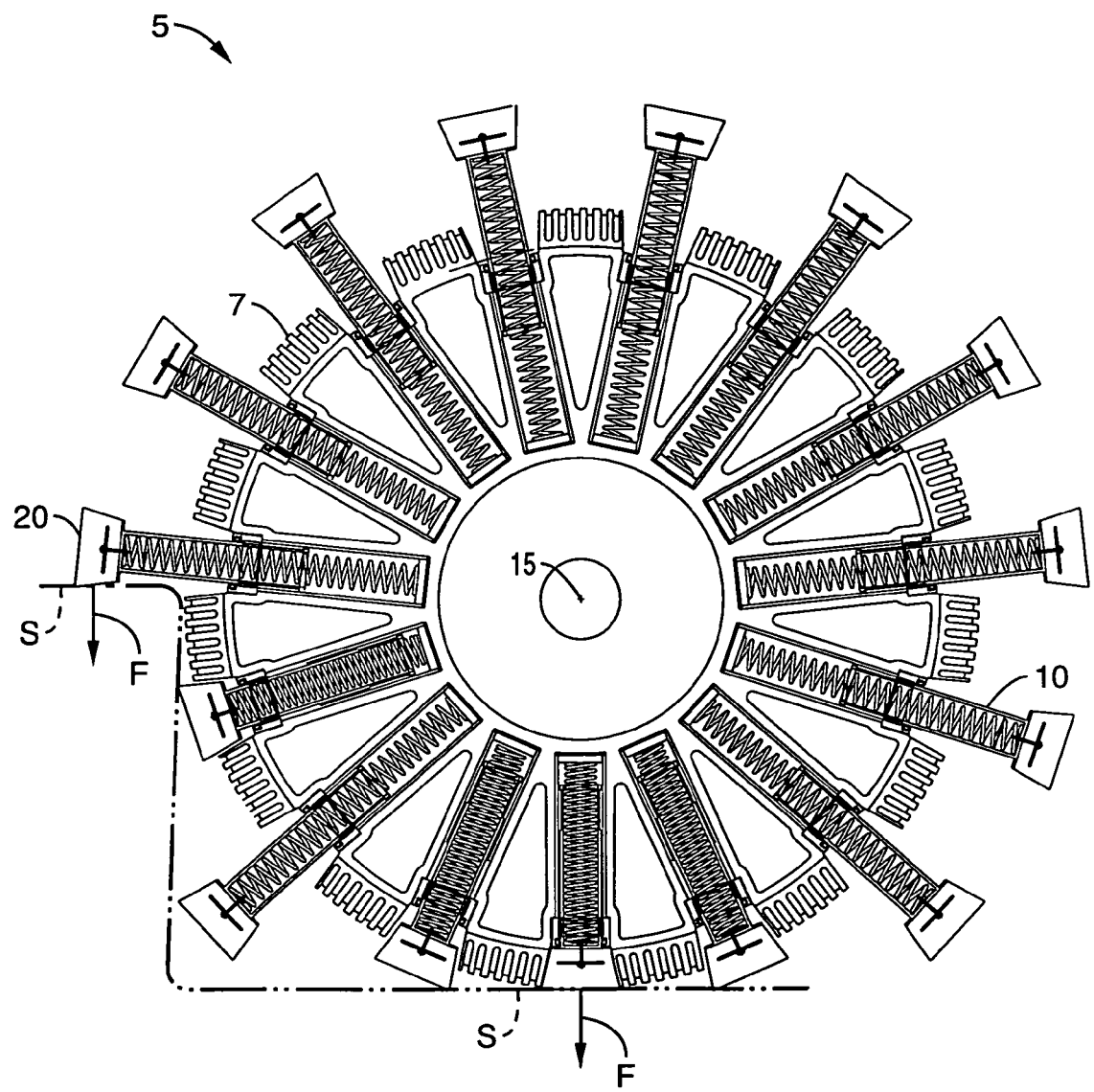
FIG. 2 shows the downward forces exerted by the subject wheel as it climbs over an obstacle.

FIGS. 1 and 2 show the subject wheel 5 with a preferred radial perimeter surface 7 (the radial perimeter surface 7 is not required for the wheel 5 to function, but is a desirable feature in some applications). A plurality of retractable and extendable spokes 10 are mounted into the wheel 5. FIG. 1A shows the spokes 10 retracted and FIG. 1B shows the spokes 10 extended. Each spoke 10 is of elongated cylindrical form with first and second ends. Each spoke 10 is radially positioned with the first end directed outward and the second end directed inward toward a center wheel hub 15, wherein the wheel hub 15 contains an axle means and computer control means for regulating spoke extension and retraction. Each spoke 10 has a surface encountering foot 20 at its first end. The surface encountering foot 20 of each spoke 10 lays flush with the perimeter surface 7 when retracted or extend out past the perimeter surface 7 when extended (the retracted position (when encountering a surface) and extended positions (when not encountering a surface) are seen FIG. 2).

As seen in FIG. 2, the spokes 10 in each wheel 5, once they project out of the radial perimeter surface 7 of the wheel 5 (seen on the far left side spoke 10 in FIG. 2), may make contact with the surface S of an obstacle in a straight down push, so that the spokes are lifting the UTD rather than using friction to climb. As the wheel 5 rotates and the wheel 5 moves up the obstacle the spoke 10 retracts (seen on the bottom spoke 10 in FIG. 2) and the mass of the wheel 5 and associated vehicle rest on the compressed/retracted spoke 10 and/or the perimeter surface 7.

Figure 3:
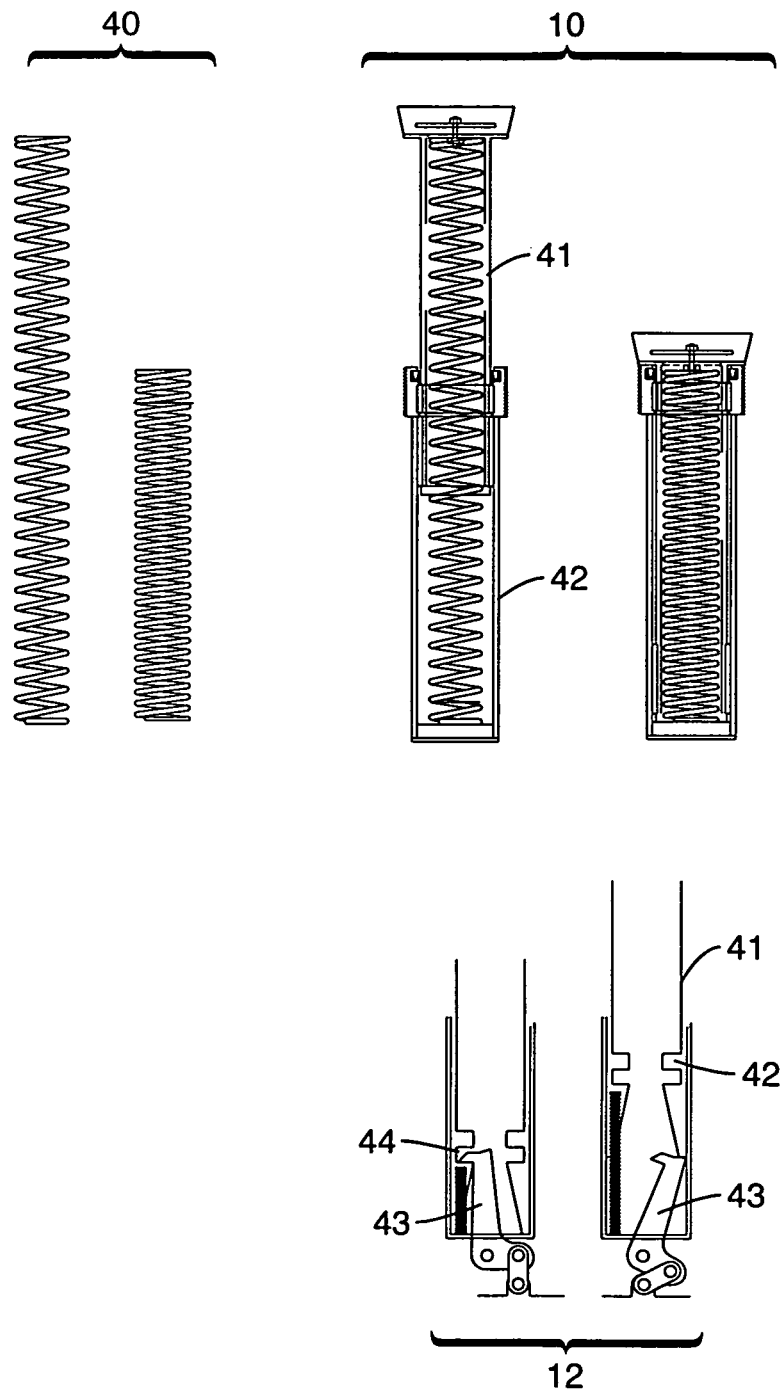
FIG. 3 shows spokes utilized in the subject invention.

An embodiment of acceptable individual spokes 10 of the subject wheel 5 are seen in FIG. 3. Each spoke 10 contains a resilient member, usually a spring 40. FIG. 3 shows the spring 40 in both the retracted (right side) and extended (left side) states. Each spoke 10 has an inner housing member 41 and an outer housing member 42 in which the inner housing member 41 slides within the outer housing member 42 during extension (left side) and retraction (right side) of the spoke 10. Suitable retention means are provided to prevent the inner housing member 41 from becoming separated from the outer housing member 42 during the extension process. When the inner housing member 41 of each spoke 10 is in the retracted position a suitable releasable locking means 12 is provided that is controlled by an associated microprocessor/computer and programming. One embodiment of the locking means 12 comprises a pivoting lever 43 with first and second ends. At the first end of the lever 43 in a pivot point and at the second end of the lever 43 is a detent that locks into a recess 44 in the inner housing member 41 when the spoke 10 is retracted/contracted (left side). Standard lever 43 actuation means are included and controlled by the related programming associated with a computer linked to the wheel hub 15.

Figure 4:
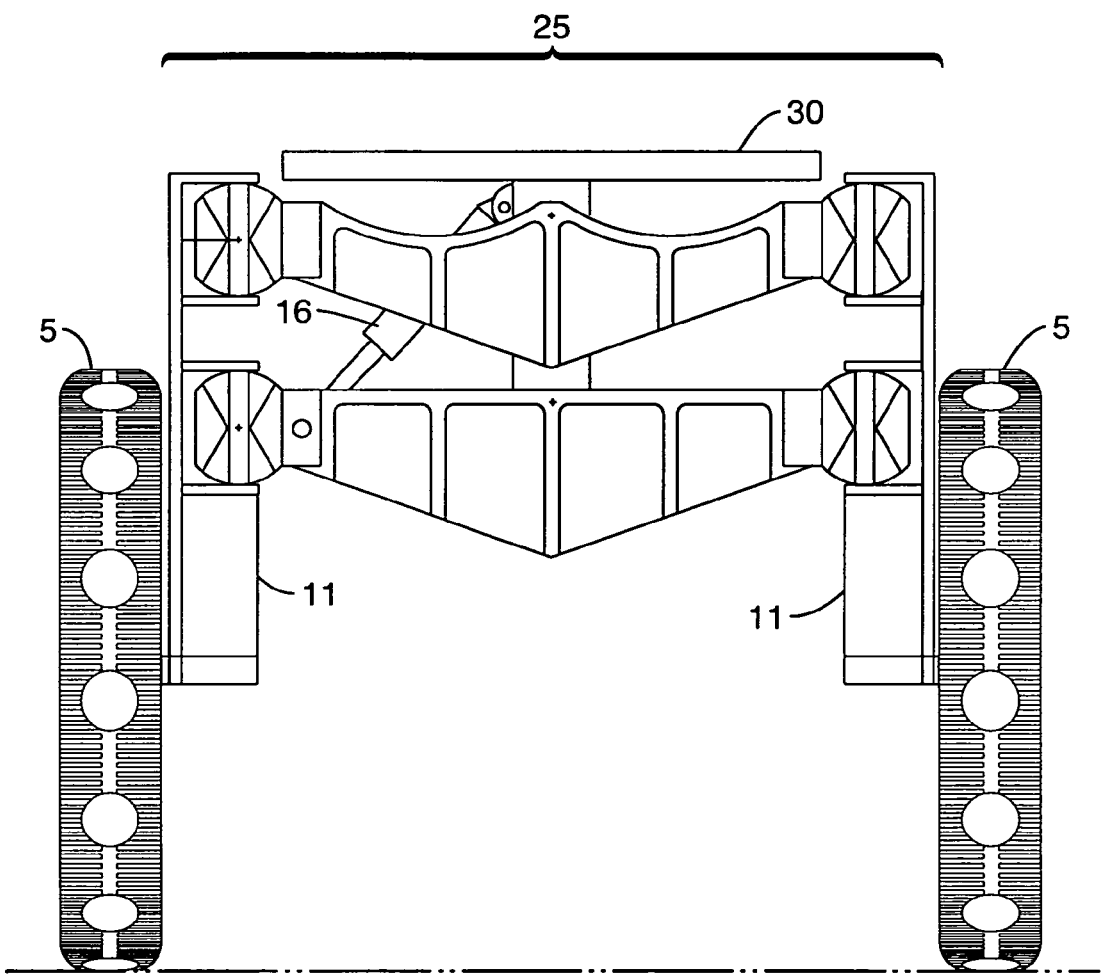
FIG. 4 shows an end view of an embodiment of the subject vehicle in which the suspension assembly and load assembly are relatively level.

FIG. 4 depicts the subject vehicle with its wheels 5, and a first motor drive/control assembly 11 that usually contains: a) an electric motor; b) an accelerometer; c) an axle positioner, and d) power supply means. Additionally, FIG. 4 shows the parallelogram suspension 25 and load assembly 30. It is noted that a second motor drive/control assembly 12 embodiment/option is shown is FIGS. 5 and 6 in which the electric motor is configured as a wheel hub motor that fits directly within the wheel. Either a wheel hub motor or a standard exterior-to-wheel electric motor (with suitable linkages) is acceptable and contemplated to be within the realm of this disclosure.

Figure 5:
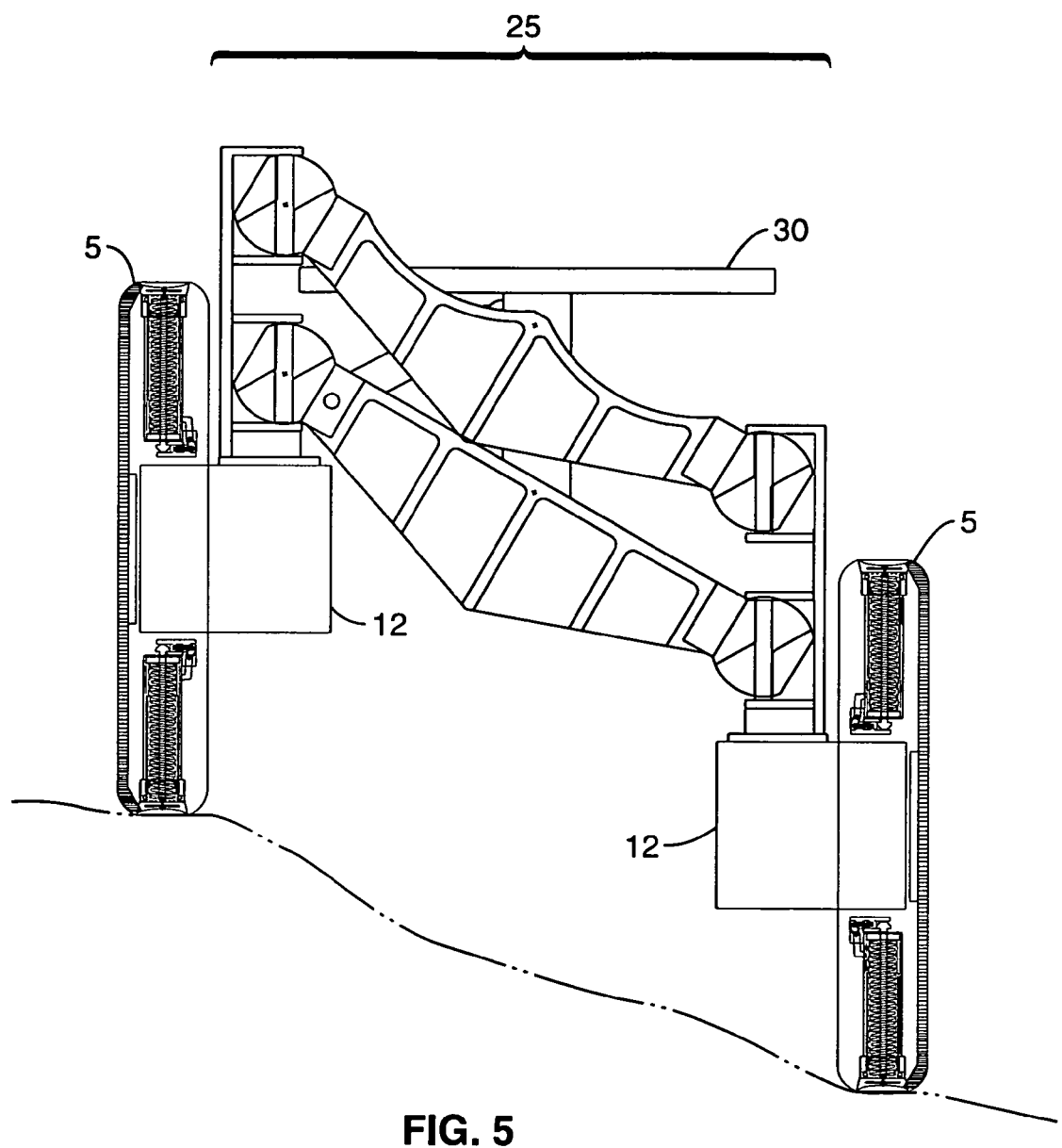
FIG. 5 shows an end view of the subject vehicle from FIG. 4, but with one set of side wheels higher than the other set of side wheels so that the suspension assembly is tilted, but the load assembly is still relatively level.
Figure 6:
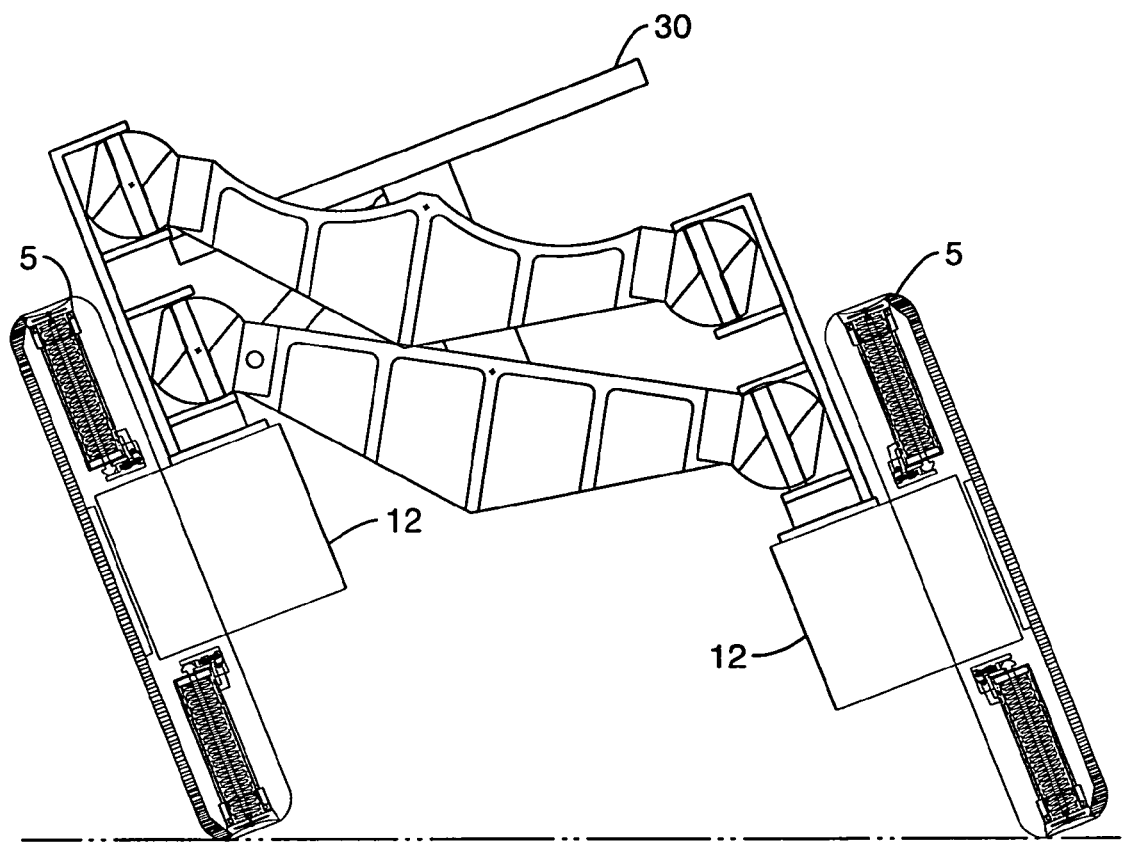
FIG. 6 shows a rear view of the main assembly, but in an angled configuration that is utilized to corner around turns.
Figure 8:
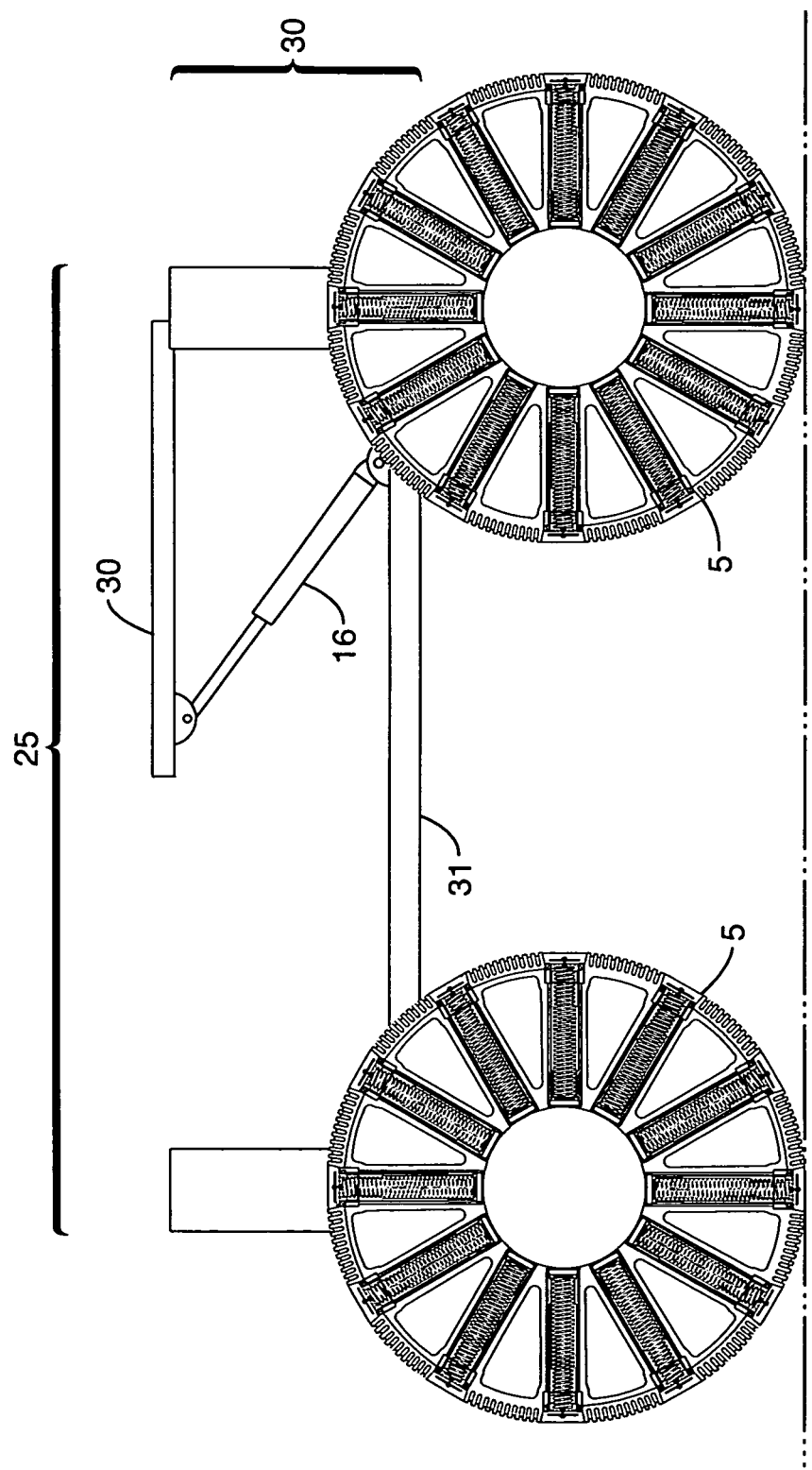
FIG. 8 shows a side view of the subject vehicle seen in FIG. 4.

Further, as seen in FIGS. 5, 6, and 8, if the UTD is climbing at an angle, a parallelogram suspension 25 rolls to the point of vertical contact with the supporting surface. In this way, even if the UTD is on a side hill, it is still using vertical forces to hold it there. The subject suspension system also utilizes electronic control means 16 (microprocessors and/or computers with suitable programming and mechanical linkages to the wheels 5, suspension 25, and frame 31) to maintain the UTD always in a default orientation that is essentially a vertical position/condition for the load assembly 30, unless other factors are present to override the default orientation. For a first example, if the UTD is going around a corner at a significant enough speed to create side or centrifugal forces on the payload on the load assembly 30, the suspension simply tilts at an angle to always maintain the payload on the load assembly 30 in a zero side force configuration. For a second example, if the subject vehicle is being used as a ATV and the user is going up a hill and then decides to turn around and go down the hill, the load assembly 30 position would go from being forward over the front wheels going up to backwards over the rear wheels going down, with the position being neutral at the apex of the turn and the suspension being rotated into the hill to maintain a vertical position. The UTD has x, y, and z movement in order to maintain a gravity neutral condition in all positions. The subject vehicle is configured so that a load assembly 30 may be lifted into a higher position if required by the operational parameters of the job function.

Figure 7:
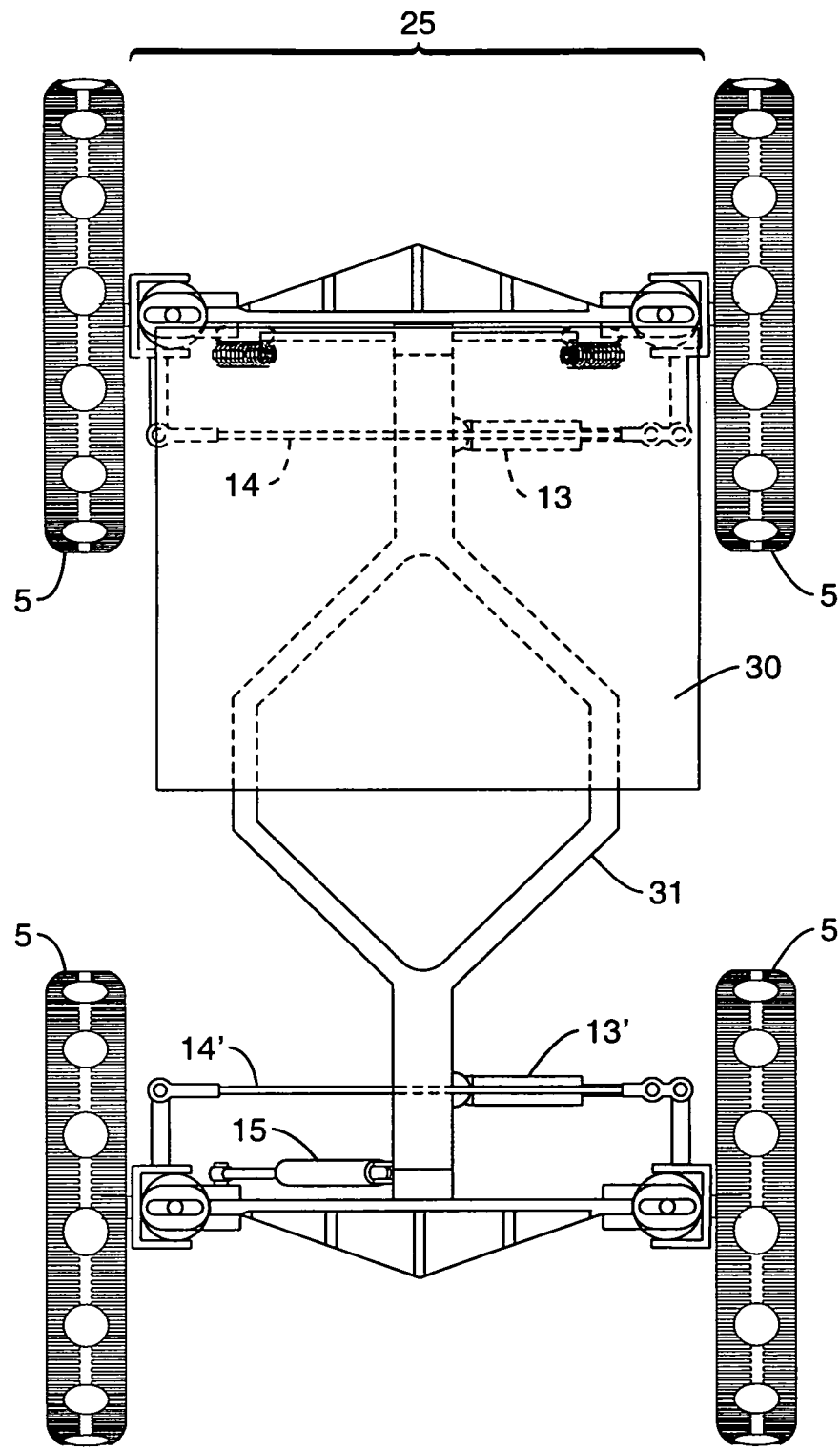
FIG. 7 shows a top view of the subject vehicle seen in FIG. 4.

FIG. 7 shows computer adjusted steering assemblies that comprise a computer-linked activator 13 (or 13' for a second set of wheels) and direction control means 14 (or 14' for a second set of wheels) mounter to the frame 31. The direction control means 14 and 14' usually comprise rods coupled to the appropriate wheels 5 that are adjusted by the computer-linked activator. Additional stabilizing means are often provided in the form of a standard shock absorber or computer adjustable means 15.

The subject vehicle is intended to operate as a hybrid in which at least one electrical motor is connected to a power supply/battery to provide motive power to the vehicle or an internal combustion engine/generator provides electric power to each motor, which in turn propels the vehicle, as desired. Since the subject vehicle is a true hybrid, it can use stored electrical energy or bottled fuel, to run on or a combination of the two.

Another benefit of this type of lifting device is that the effects of the UTD are actually less impactful on the surface terrain than a person's foot.

Additionally, the subject device may be employed as a robot or robot platform that can go into almost any type of environment and operate properly. The subject system will work under water just as well as on solid ground, making it ideal for an underwater repair robot for working on deep water oil wells, and in other environments that are not able to be handled by a human body.

Further, the UTD can also go into fires and stand up to temperatures far above that of a human host. The total flexibility of the suspension also allows this device to right itself if it suddenly finds itself rolled over or upside down.

More specifically, the subject vehicle is made up of several main assemblies. As shown in FIGS. 1A, 1B, and 2, the first assembly is the wheel 5 with deployable (retracted or extended) spokes 10 that project out from the center of the wheel 5 to create vertical lifting forces on whatever surface S it is traversing. Surfaces S may include a wide variety of terrains such as stairs (as seen in FIG. 2), rocks, logs, or any other variable geometry surface.

Each drive motor has an integrated gearbox and motor associated components that allow the subject vehicle to crawl at a very slow speed or run down a smooth surface at approximately 25 MPH. For example, an exemplary unit generates about 100 ft. lbs. of stall torque, but can also run up to 400 rpm at load. Again, each drive motor may be standard motor that is linked to each wheel by suitable means or a hub motor that is mounted as the hub of each wheel.

For powering the subject vehicle, one or more battery packs (power providing unit) of standard configuration for supplying electricity to each motor and an optional generator (placed in a suitable location in the vehicle) that is powered by a suitable fuel are included. Each battery pack can be charged up and used as a standard battery or there can be generator fuel loaded onto the vehicle for use by the generator for generating electrical power to charge the batteries, which, in turn, propel the vehicle. A combination battery pack/generator is also optional.

Figure 9:
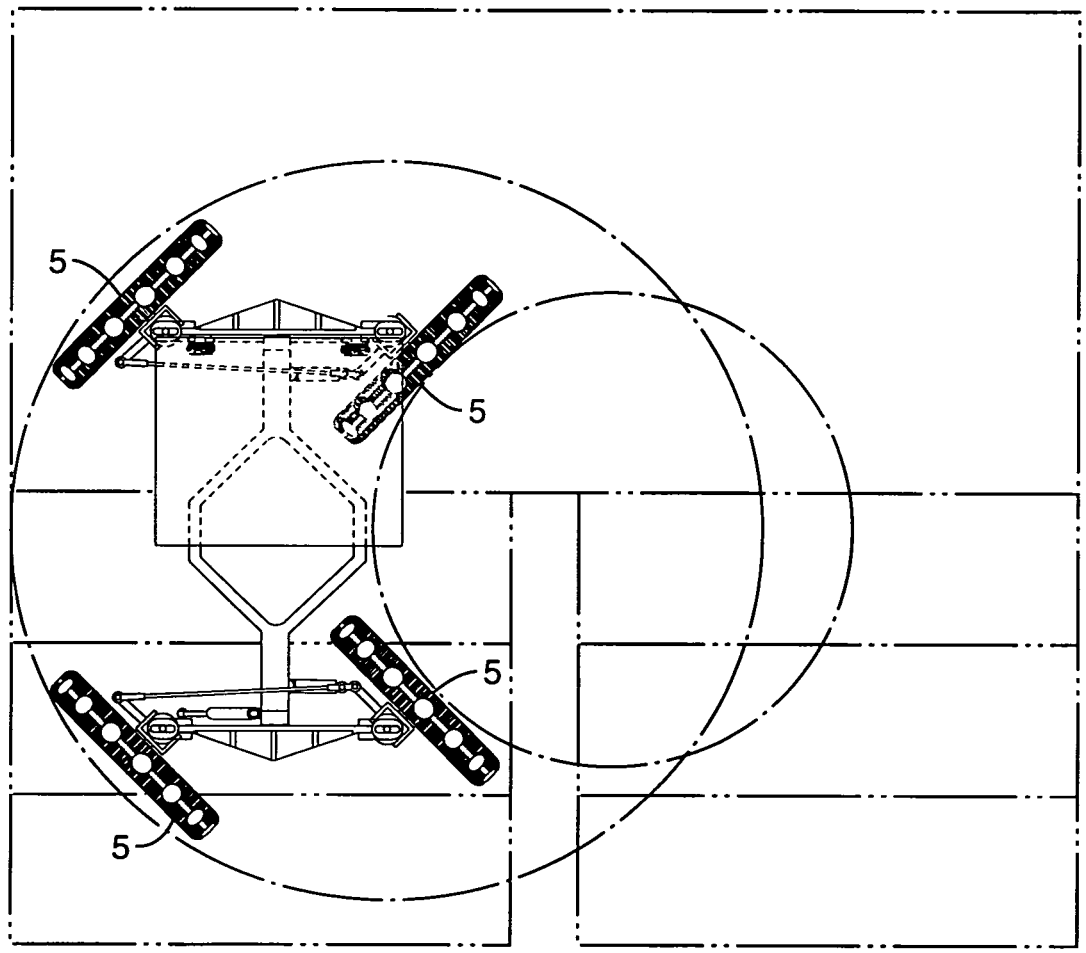
FIG. 9 shows a top view of the main assembly with the wheels turned to steer a tightly executed circle.

A critical assembly comprises the suspension system 25 (generally shown in FIGS. 4-8) which is based on a very light weight constructed parallelogram suspension configuration that permits the wheels 5 to go up and down, but maintains the wheels 5 in an approximately vertical position (except when cornering) and the load assembly 30 in a level orientation. As depicted in FIG. 9, the subject suspension 25 also allows all of the wheels 5 to pivot (front set together and rear set together) for turning, if desired. FIG. 6 shows that the wheels 5 may lean into a curve to maintain the load assembly 30 in a tilted position to counter the centripetal forces of the turn.

Figure 10A:
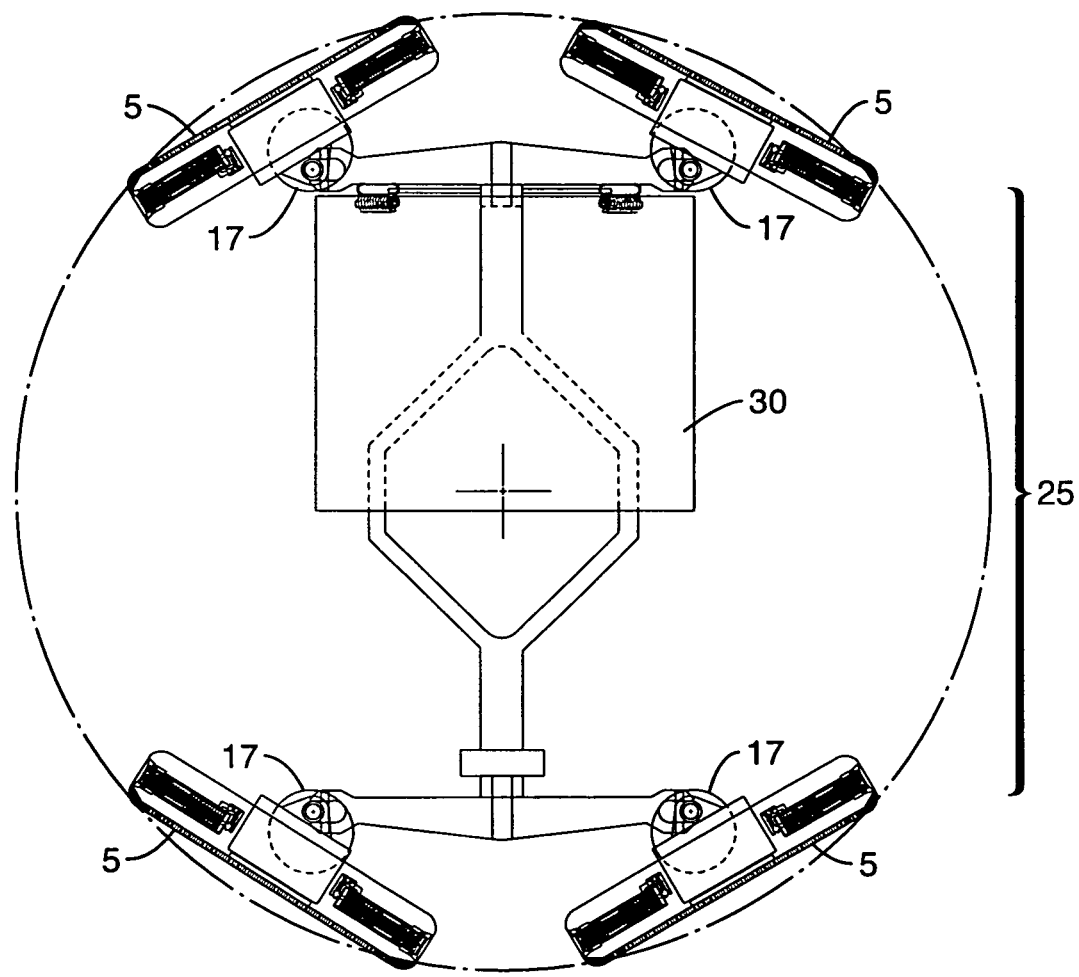
FIG. 10A shows a top view of the subject vehicle in which the wheels may rotate to execute a turn within the length of the subject vehicle.
Figure 10B:
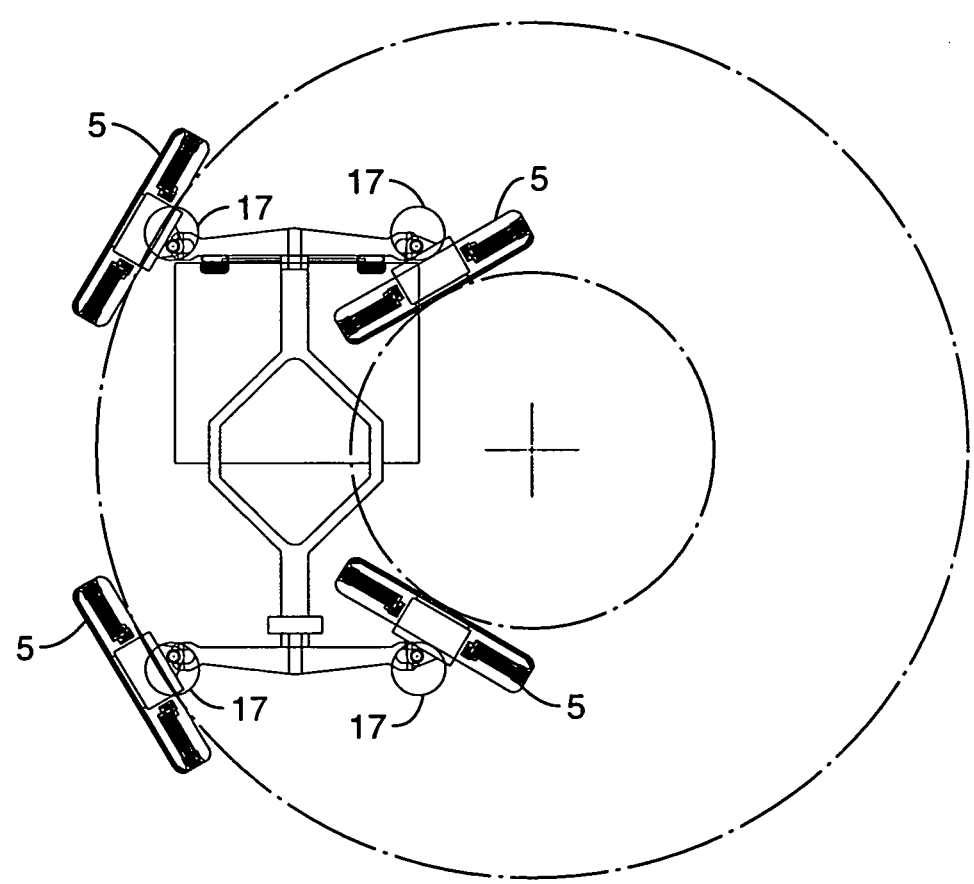
FIG. 10B shows a top view of the subject vehicle in which the two front wheels and two rear wheels are angled to different degrees to complete any desired turn radius.

FIGS. 10A and 10B show that the frame ties into the parallelogram axle supports 17 with a vertical stress member so that the wheels 5 can turn over 100 degrees, allowing the vehicle to turn in its own length (FIG. 10A). Clearly, each wheel 5 may be directed to any desired rotational orientation (FIGS. 10A and 10B). The frame 25 is configured to handle all of the mountings for whatever payload was designated for the vehicle.

Figure 11A:
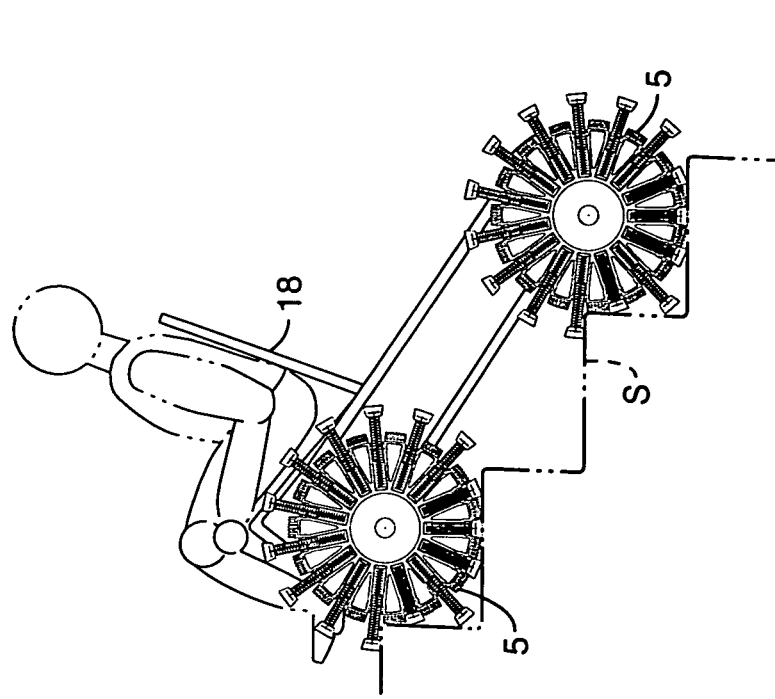
FIG. 11A shows an assembly that includes a payload slide device that allows the payload/load assembly to be shifted if the device is descending an encounter obstacle (set of stairs in the depicted example).
Figure 11B:
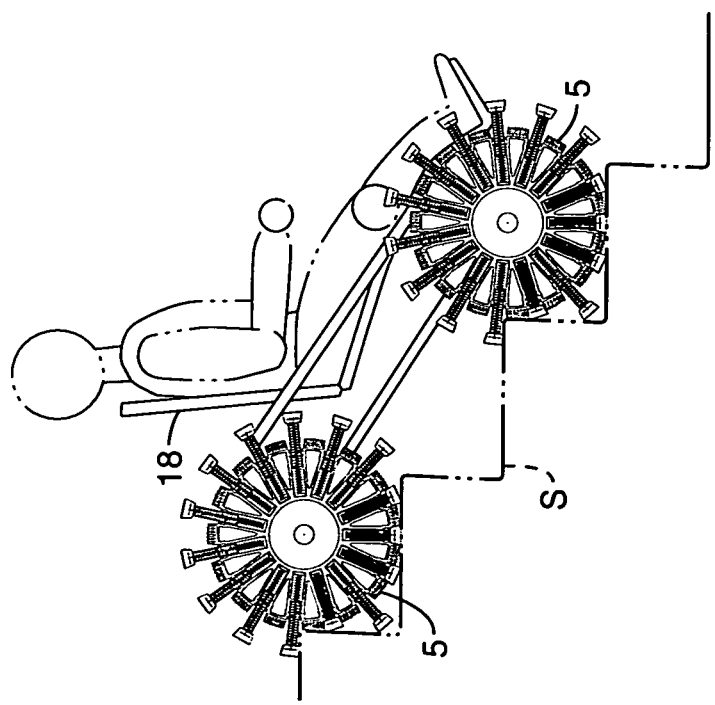
FIG. 11B shows an assembly that includes a payload slide device that allows the payload/load assembly to be shifted if the device is climbing an encounter obstacle (set of stairs in the depicted example).

As is shown in FIGS. 11A and 11B, the subject device includes a payload slide means 18 that allows the payload (load assembly 30) to be shifted forward, if the device is climbing, or backwards if the device is descending. This property is illustrated in FIGS. 11A and 11B as a passenger riding the subject device down a stairway (FIG. 11A) and going up a stairway (FIG. 11 B).

One of more electronics control units are included which through use of basic instrumentation, can sense if the vehicle is going into an unstable configuration and back out of it, or see a situation coming up that can create an unstable configuration. Examples of this would be a cliff coming up, an assent or decent that is too steep to traverse. It would also activate the electronic linear actuators that maintain the position and attitude of the vehicle. If the vehicle is traveling at high speed, the device could literally ignore a hole or bump that It was going over by shifting weight and taking weight off of 1 wheel at a time and then shifting weight back and taking weight off of the other wheel when it gets to the hole or bump.

One or more computer facilitated and programmed electronic controllers operate the spoke extension/retraction and maintain stabilization of the "front to back" and "left to right: tilts of the subject vehicle. The wheel axles are equipped in suitable locations with accelerometers to detect the angle of the axle referenced to and relative to a level orientation on a generally flat supporting surface. When any of the electronic controllers detect that an axle is moving off of level (due to a wheel beginning to descent or climb an obstacle), it will immediately adjust an included axle positioner to maintain the body of the subject vehicle in a level orientation. This is an ongoing process of evaluation and orientation adjustment via the axle positioners, which maintains the occupant/passenger/load in a relatively level orientation.

A "differential" configuration/equivalent is created through suitable programming within the controller and interfaced with the spokes and axle positioners. When a steering position sensor detects that the wheels are not going in a straight line, it increases the speed on the outside wheels and decreases the speed on the inside wheels to allow the subject vehicle to turn without skidding the wheels. The subject vehicle is able to do this due to the four wheel independent drive capabilities of the subject device. Also, the subject vehicle is able to detect, due to the speed sensors/accelerometers of each wheel, when a wheel has started to slip (due to ice or other low friction surface) and decreases drive power to the slipping wheel while maintaining drive power to the wheels that still have drive traction.

Four wheel steering is configured into the subject vehicle. With a steering/drive motor attached to or in the hub of each wheel, each wheel is capable of independent (from each of the other wheels) steering. This feature permits a light weight control that a mechanical linkage configuration. Also, it allows a for a far smaller turning radius (as indicated above and seen in FIGS. 10A and 10B), permitting better maneuvering in cramped spaces often found indoors or near immovable/large objects. If desired, the exact wheel steering configuration can be modified "on the fly" to go from four wheel steering at low speeds to two wheel steering at higher speeds for better stability. Additionally, the subject configuration also allows rear wheel steering for reverse drive.

Included in the subject vehicle are adaptable user controls. With all controls being sensed and reacted to electronically via computer and associated programming, almost any type of user control means can be adapted/configured to drive the subject vehicle. Besides the traditional joy-stick or handle bars, other types of controls often used by people with physical challenges/handicaps can be utilized.

Disclosed embodiments of the subject invention include universal traction device for movement over even and uneven supporting surfaces, comprising: a) an all-terrain wheel utilized in conjunction with a transportation vehicle, comprising: i) a circular wheel assembly having an outer perimeter edge and a central hub region radial disposed about a rotation point for the circular wheel; ii) a plurality of spoke-containing components having first and second ends, wherein the plurality of spoke-containing units are arrayed around the outer perimeter edge with the first end proximate the outer perimeter edge and the second end proximate the hub region; and iii) control means for extending the spokes from the spoke-containing units when encountering an obstacle that the wheel is to traverse and retracting the spokes into the spoke-containing units when the spokes are no longer required for traversing the obstacle; and b) a vehicle having at least one said all-terrain wheel.

A further embodiment is an all-terrain transportation system for moving over even or uneven supporting surfaces, comprising: a) an all-terrain wheel utilized in conjunction with a transportation vehicle, comprising: i) a circular wheel assembly having an outer perimeter edge and a central hub region radial disposed about a rotation point for the circular wheel; ii) a plurality of spoke-containing components having first and second ends, wherein the plurality of spoke-containing units are arrayed around the outer perimeter edge with the first end proximate the outer perimeter edge and the second end proximate the hub region; and iii) first control means for extending the spokes from the spoke-containing units when encountering an obstacle that the wheel is to traverse and retracting the spokes into the spoke-containing units when the spokes are no longer required for traversing the obstacle; b) a wheel axle coupled to each all-terrain wheel and mounted to the transportation vehicle; c) the transportation vehicle having at least one all-terrain wheel; d) an electric motor configured to drive each all-terrain wheel and associated with the transportation vehicle; e) an electrical power supply means coupled to each electric motor and associated with the transportation vehicle; f) a vehicle parallelogram suspension means configured to permit each all-terrain wheel to move up and down; g) a frame means associated with the parallelogram that permits each all-terrain wheel to turn over approximately 100 degrees, thereby allowing the transportation vehicle to turn in its own length; h) a payload slide means associated with the parallelogram suspension means that allows a payload to be shifted either forward or backward depending on climbing or descending obstacles; and i) second control means for sensing and stabilizing said transportation vehicle if the transportation vehicle is going into an unstable alignment relative to the even or uneven supporting surfaces.

As additional embodiment includes the first control means being a programmed computer means and the second control means being a programmed computer means that is interfaced with: a) an accelerometer linked to each said wheel axle and b) an axle positioner coupled to each said wheel axle.

An additional embodiment of the subject invention includes an all-terrain wheel utilized in conjunction with a transportation vehicle, wherein the all-terrain wheel comprises: a) a circular wheel assembly having an outer perimeter edge and a central hub region radial disposed about a rotation point for said circular wheel; b) a plurality of spoke-containing components having first and second ends, wherein the plurality of spoke-containing units are arrayed around the outer perimeter edge with the first end proximate the outer perimeter edge and the second end proximate the hub region; and c) control means for extending the spokes from the spoke-containing units when encountering an obstacle that the wheel is to traverse and retracting the spokes into the spoke-containing units when the spokes are no longer required for traversing the obstacle, wherein the control means comprises a programmed computer means.

Embodiments of the subject technology may be described with reference to flowchart illustrations of methods and systems according to embodiments of the technology, and/or algorithms, formulae, or other computational depictions, which may also be implemented as computer program products. In this regard, each block or step of a flowchart, and combinations of blocks (and/or steps) in a flowchart, algorithm, formula, or computational depiction can be implemented by various means, such as hardware, firmware, and/or software including one or more computer program instructions embodied in computer-readable program code logic. As will be appreciated, any such computer program instructions may be loaded onto a computer, including without limitation a general purpose computer or special purpose computer, or other programmable processing apparatus to produce a machine, such that the computer program instructions which execute on the computer or other programmable processing apparatus create means for implementing the functions specified in the block(s) of the flowchart(s).

Accordingly, blocks of the flowcharts, algorithms, formulae, or computational depictions support combinations of means for performing the specified functions, combinations of steps for performing the specified functions, and computer program instructions, such as embodied in computer-readable program code logic means, for performing the specified functions. It will also be understood that each block of the flowchart illustrations, algorithms, formulae, or computational depictions and combinations thereof described herein, can be implemented by special purpose hardware-based computer systems which perform the specified functions or steps, or combinations of special purpose hardware and computer-readable program code logic means.

Furthermore, these computer program instructions, such as embodied in computer-readable program code logic, may also be stored in a computer-readable memory that can direct a computer or other programmable processing apparatus to function in a particular manner, such that the instructions stored in the computer-readable memory produce an article of manufacture including instruction means which implement the function specified in the block(s) of the flowchart (s). The computer program instructions may also be loaded onto a computer or other programmable processing apparatus to cause a series of operational steps to be performed on the computer or other programmable processing apparatus to produce a computer-implemented process such that the instructions which execute on the computer or other programmable processing apparatus provide steps for implementing the functions specified in the block(s) of the flowchart(s), algorithm(s), formula(e), or computational depiction(s).

It will further be appreciated that the terms "programming" or "program executable" as used herein refer to one or more instructions that can be executed by a processor to perform a function as described herein. The instructions can be embodied in software, in firmware, or in a combination of software and firmware. The instructions can be stored local to the device in non-transitory media, or can be stored remotely such as on a server, or all or a portion of the instructions can be stored locally and remotely. Instructions stored remotely can be downloaded (pushed) to the device by user initiation, or automatically based on one or more factors. It will further be appreciated that as used herein, that the terms processor, computer processor, central processing unit (CPU), and computer are used synonymously to denote a device capable of executing the instructions and communicating with input/output interfaces and/or peripheral devices.

Although the description herein contains many details, these should not be construed as limiting the scope of the disclosure but as merely providing illustrations of some of the presently preferred embodiments. Therefore, it will be appreciated that the scope of the disclosure fully encompasses other embodiments which may become obvious to those skilled in the art.

In the claims, reference to an element in the singular is not intended to mean "one and only one" unless explicitly so stated, but rather "one or more." All structural, chemical, and functional equivalents to the elements of the disclosed embodiments that are known to those of ordinary skill in the art are expressly incorporated herein by reference and are intended to be encompassed by the present claims. Furthermore, no element, component, or method step in the present disclosure is intended to be dedicated to the public regardless of whether the element, component, or method step is explicitly recited in the claims. No claim element herein is to be construed as a "means plus function" element unless the element is expressly recited using the phrase "means for". No claim element herein is to be construed as a "step plus function" element unless the element is expressly recited using the phrase "step for".

What is claimed is:

1. A universal traction device for movement over even and uneven supporting surfaces, comprising:
  a. a plurality of all-terrain wheels utilized in conjunction with a transportation vehicle, wherein each said all-terrain wheel comprises:
    i. a circular wheel assembly having an outer perimeter edge and a central hub region radial disposed about a rotation point for said circular wheel;
    ii. a plurality of spoke-containing components having first and second ends, wherein said plurality of spoke-containing units are arrayed around said outer perimeter edge with said first end proximate said outer perimeter edge and said second end proximate said hub region;
    iii. a plurality of extendable and retractable spokes, wherein each said extendable and retractable spoke is fitted within each said spoke-containing unit; and
    iv. releasable locking means for securing said plurality of extendable and retractable spokes in a retracted configuration within said spoke-containing units when said spokes are no longer required in an extended configuration for traversing an obstacle; and
  b. said vehicle to which said plurality of all-terrain wheels are mounted.

2. An all-terrain transportation system for moving over even or uneven supporting surfaces, comprising:
  a. a plurality of all-terrain wheels utilized in conjunction with a transportation vehicle, wherein each said all-terrain wheel comprises:
    i. a circular wheel assembly having an outer perimeter edge and a central hub region radial disposed about a rotation point for said circular wheel;
    ii. a plurality of spoke-containing components having first and second ends, wherein said plurality of spoke-containing units are arrayed around said outer perimeter edge with said first end proximate said outer perimeter edge and said second end proximate said hub region;
    iii. a plurality of extendable and retractable spokes, wherein each said extendable and retractable spoke is fitted within each said spoke-containing unit; and
    iv. releasable locking means for securing said plurality of extendable and retractable spokes in a retracted configuration within said spoke-containing units when said spokes are no longer required in an extended configuration for traversing an obstacle;

b. a wheel axle coupled to each said all-terrain wheel and mounted to said transportation vehicle;
c. a said transportation vehicle having at least one said all-terrain wheel;
d. an electric motor configured to drive each said all-terrain wheel and associated with said transportation vehicle;
e. an electrical power supply means coupled to each said electric motor and associated with said transportation vehicle;
f. a vehicle parallelogram suspension means configured to permit each said all-terrain wheel to move up and down;
g. a frame means associated with said parallelogram that permits each said all-terrain wheel to turn over approximately 100 degrees, thereby allowing said transportation vehicle to turn in its own length;
h. a payload slide means associated with said parallelogram suspension means that allows a payload to be shifted either forward or backward depending on climbing or descending obstacles; and
i. a control means for sensing and stabilizing said transportation vehicle if said transportation vehicle is going into an unstable alignment relative to the even or uneven supporting surfaces.

3. An all-terrain transportation system according to claim 2, where said control means comprises a programmed computer means that is interfaced with:
a. an accelerometer linked to each said wheel axle and
b. an axle positioner coupled to each said wheel axle.

4. An all-terrain wheel utilized in conjunction with a transportation vehicle, wherein said all-terrain wheel comprises:
a. a circular wheel assembly having an outer perimeter edge and a central hub region radial disposed about a rotation point for said circular wheel;
b. a plurality of spoke-containing components having first and second ends, wherein said plurality of spoke-containing units are arrayed around said outer perimeter edge with said first end proximate said outer perimeter edge and said second end proximate said hub region
c. a plurality of extendable and retractable spokes, wherein each said extendable and retractable spoke is fitted within each said spoke-containing unit; and
d. releasable locking means for securing said plurality of extendable and retractable spokes in a retracted configuration within said spoke-containing units when said spokes are no longer required in an extended configuration for traversing an obstacle.

* * * * *